Patented Jan. 12, 1937

2,067,686

UNITED STATES PATENT OFFICE 2,067,686

ANTIOXIDANTS

Waldo L. Semon, Silver Lake Village, Ohio, assignor to The B. F. Goodrich Company, New York, N. Y., a corporation of New York No Drawing. Application June 2, 1933,
Serial No. 674,041

6 Claims. (Cl. 18—50)

This invention relates to the art of preserving rubber, synthetic plastics, fatty oils, petroleum products, and like organic materials against unduly rapid deterioration due to oxidation and the like.

This invention, in brief, consists in treating the rubber or other like organic material with a member of a class of compounds which may be designated as symmetrical aliphatic disubstituted arylene diamines. By symmetrical is meant simply that the two aliphatic substituents are attached to different amino groups and not to the same amino group. It is not necessary that both aliphatic substituents be identical, but it is important that they be attached to secondary amino groups. For example, the symmetrical compound, p-di(methylamino)benzene, which has the structural formula

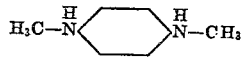

contains two secondary amino groups and is a member of the class of compounds defined above. It is an excellent anti-oxidant and does not appreciably accelerate the vulcanization of rubber. On the other hand, unsymmetrical dimethyl p-phenylene diamine, otherwise known as p-amino dimethylaniline, although it is an isomer of the compound just mentioned above, does not contain any secondary amino group, but instead contains one primary and one tertiary amino group and therefore possesses properties quite different from those of the compounds of this invention, and in particular strongly accelerates the vulcanization of rubber. It is to be understood, therefore, that reference hereinafter to a substituent on any amino group is intended to exclude other substituents than those specified, so as to define secondary and not tertiary amines.

The aliphatic substituent groups may be any straight or branched chain alkyl groups such as methyl, ethyl, propyl, isopropyl, butyl, secondary butyl, tertiary butyl, amyl, hexyl, heptyl, etc., as well as ring substituted alkyl groups such as benzyl and phenyl-ethyl groups, which, although not strictly aliphatic in nature, undergo the characteristic reactions of and confer upon their compounds essentially the same properties as purely aliphatic groups. The arylene nucleus may contain one or more directly connected aromatic rings, either conjugated or not, with the two amino groups substituted in any positions, although the para position is generally preferred.

For example, the following compounds are typical members of the class of anti-oxidants described above: o-di(methylamino)benzene; m-di(methylamino)benzene; p-di(methylamino)benzene; 2,5 di(methylamino)toluene; 2,4 di(methylamino)toluene; 2,4 di(methylamino) cumene; 1,4 di(methylamino) 2-methyl 5-isopropyl benzene; 2,5 di(methylamino)biphenyl; symmetrical dimethyl benzidine; symmetrical dimethyl tolidine; symmetrical dimethyl naphthidine; 1,2 di(methylamino)naphthalene; 1,4 di(methylamino)naphthalene; 1,5 di(methylamino)naphthalene; 1,8 di(methylamino)naphthalene; di(methylamino)anthracene; p-di(ethylamino)benzene; p-di(n-propylamino)benzene; p-di(isopropyl-amino)benzene; p-di(benzylamino)benzene; N-methyl N'-benzyl p-phenylene diamine; symmetrical di-isopropyl benzidine; symmetrical dibenzyl benzidine; 1,4 di(isopropylamino)naphthalene; etc. Any of the above-enumerated compounds may be used with good effect to retard the deterioration of rubber or other like organic substances, preferably in moderately small proportions, say from 0.1 to 5 per cent.

As a specific example of one embodiment of the invention of this application, a rubber composition is prepared containing blended plantation rubber 100 parts by weight, sulphur 5.5 parts, zinc oxide 30 parts, gas black 40 parts, mineral rubber 10 parts, palm oil 5 parts, and hexamethylene tetramine 0.75 part. One portion of this composition is used as a control, while another portion is further mixed with 0.96 part by weight (0.5% of the composition) of p-di(isopropylamino)benzene. After vulcanization in a press for 45 minutes at 294° F. to produce an optimum cure, it is found that the composition containing the antioxidant deteriorates only approximately half as fast as the control composition when subjected to an accelerated aging test such as the Geer oven test.

It is to be understood that the term "treating" is employed in the appended claims in a generic sense to include either the incorporation of the anti-oxidants into the rubber or the like by mixing them into the said material while it is in a plastic or fluid condition, or by applying them to the surface of a solid mass thereof, as a paste, powder or solution. The term "rubber" is likewise employed in the claims in a generic sense to include caoutchouc, both natural and synthetic, balata, gutta-percha, rubber isomers, and like products, whether or not admixed with fillers, pigments, or vulcanizing or accelerating agents.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed without departing from the spirit and scope of the invention as defined in the appended claims.

This application is a continuation in part of my co-pending application Serial No. 281,585, filed May 29, 1928, now Patent 1,940,815.

I claim:

1. The method of preserving rubber which comprises treating rubber with a symmetrical aralkyl disubstituted para-arylene diamine.

2. The method of preserving rubber which comprises treating rubber with a symmetrical dibenzyl substituted para-arylene diamine.

3. The method of preserving rubber which comprises treating rubber with p-di(benzylamino) benzene.

4. A composition comprising rubber and a symmetrical aralkyl disubstituted para-arylene diamine.

5. A composition comprising rubber and a symmetrical dibenzyl substituted para-arylene diamine.

6. A composition comprising rubber and p-di(benzylamino)benzene.

WALDO L. SEMON.